(12) United States Patent
Ghiggini et al.

(10) Patent No.: US 12,182,427 B2
(45) Date of Patent: Dec. 31, 2024

(54) CONTROLLING DATA ALLOCATION TO STORAGE CIRCUITRY

(71) Applicant: Arm Limited, Cambridge (GB)

(72) Inventors: Stefano Ghiggini, Antibes (FR); Natalya Bondarenko, Antibes (FR); Luca Nassi, Antibes (FR); Geoffray Matthieu Lacourba, Nice (FR); Huzefa Moiz Sanjeliwala, Austin, TX (US); Miles Robert Dooley, Austin, TX (US); Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 25 days.

(21) Appl. No.: 17/966,071

(22) Filed: Oct. 14, 2022

(65) Prior Publication Data

US 2024/0126458 A1  Apr. 18, 2024

(51) Int. Cl.
    *G06F 3/06* (2006.01)
(52) U.S. Cl.
    CPC .......... *G06F 3/0634* (2013.01); *G06F 3/0604* (2013.01); *G06F 3/0659* (2013.01); *G06F 3/0673* (2013.01)

(58) Field of Classification Search
    None
    See application file for complete search history.

(56) References Cited

U.S. PATENT DOCUMENTS

| | | | |
|---|---|---|---|
| 10,346,095 B2 * | 7/2019 | Joshi | G06F 3/0662 |
| 2006/0184804 A1 * | 8/2006 | Varma | G06F 12/0897 713/193 |
| 2013/0198459 A1 * | 8/2013 | Joshi | G06F 12/0871 711/133 |

\* cited by examiner

*Primary Examiner* — Charles J Choi
(74) *Attorney, Agent, or Firm* — NIXON & VANDERHYE P.C.

(57) ABSTRACT

An apparatus is provided for controlling the operating mode of control circuitry, such that the control circuitry may change between two operating modes. In an allocation mode, data that is loaded in response to an instruction is allocated into storage circuitry from an intermediate buffer, and the data is read from the storage circuitry. In a non-allocation mode, the data is not allocated to the storage circuitry, and is read directly from intermediate buffer. The control of the operating mode may be performed by mode control circuitry, and the mode may be changed in dependence on the type of instruction that calls the data, and whether the data may be used again in the near future, or whether it is expected to be used only once.

12 Claims, 13 Drawing Sheets

CONTROLLING DATA ALLOCATION TO STORAGE CIRCUITRY

TECHNICAL FIELD

The present disclosure relates to data processing, and in particular the allocation of data in cache memory.

DESCRIPTION

A memory hierarchy can improve the latency of accesses to data. However, the space within each element of a memory hierarchy is limited and the storage of the wrong data can lead to inefficiencies in the system due to increased bandwidth and power consumption.

SUMMARY

Viewed from a first example configuration, there is provided an apparatus comprising: control circuitry configured to control allocation of a given data item to storage circuitry and storage of the given data item to an intermediate buffer, wherein the intermediate buffer intermediates the storage circuitry and further storage circuitry arranged in a memory hierarchy; hit notification circuitry configured to receive a hit signal indicative of a lookup operation performed in the further storage circuitry resulting in a hit, the lookup operation indicating the given data item, wherein in response to the hit signal, the hit notification circuitry is configured to cause the control circuitry to store the given data item in the intermediate buffer; and mode control circuitry configured to change an operating mode of the control circuitry between an allocation mode and a non-allocation mode, wherein in the allocation mode, the control circuitry is configured to cause the allocation of the given data item from the intermediate buffer to the storage circuitry prior to causing the given data item to be deleted from the intermediate buffer; and in the non-allocation mode, the control circuitry is configured to suppress the allocation of the given data item from the intermediate buffer to the storage circuitry.

Viewed from a second example configuration, there is provided a method comprising: controlling allocation of a given data item to storage circuitry and storage of the data item to an intermediate buffer, wherein the intermediate buffer intermediates the storage circuitry and further storage circuitry arranged in a memory hierarchy; receiving a hit signal indicative of a lookup operation performed in the further storage circuitry resulting in a hit, the lookup operation indicating the given data item, wherein in response to the hit signal, the given data item is stored in the intermediate buffer; and changing an operating mode between an allocation mode and a non-allocation mode, wherein in the allocation mode, the allocation of the given data item from the intermediate buffer to the storage circuitry occurs prior to causing the given data item to be deleted from the intermediate buffer; and in the non-allocation mode, the allocation of the given data item from the intermediate buffer to the storage circuitry is suppressed.

Viewed from a third example configuration, there is provided a non-transitory computer-readable medium to store computer-readable code for fabrication of an apparatus comprising: control circuitry configured to control allocation of a given data item to storage circuitry and storage of the given data item to an intermediate buffer, wherein the intermediate buffer intermediates the storage circuitry and further storage circuitry arranged in a memory hierarchy; hit notification circuitry configured to receive a hit signal indicative of a lookup operation performed in the further storage circuitry resulting in a hit, the lookup operation indicating the given data item, wherein in response to the hit signal, the hit notification circuitry is configured to cause the control circuitry to store the given data item in the intermediate buffer; and mode control circuitry configured to change an operating mode of the control circuitry between an allocation mode and a non-allocation mode, wherein in the allocation mode, the control circuitry is configured to cause the allocation of the given data item from the intermediate buffer to the storage circuitry prior to causing the given data item to be deleted from the intermediate buffer; and in the non-allocation mode, the control circuitry is configured to suppress the allocation of the given data item from the intermediate buffer to the storage circuitry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
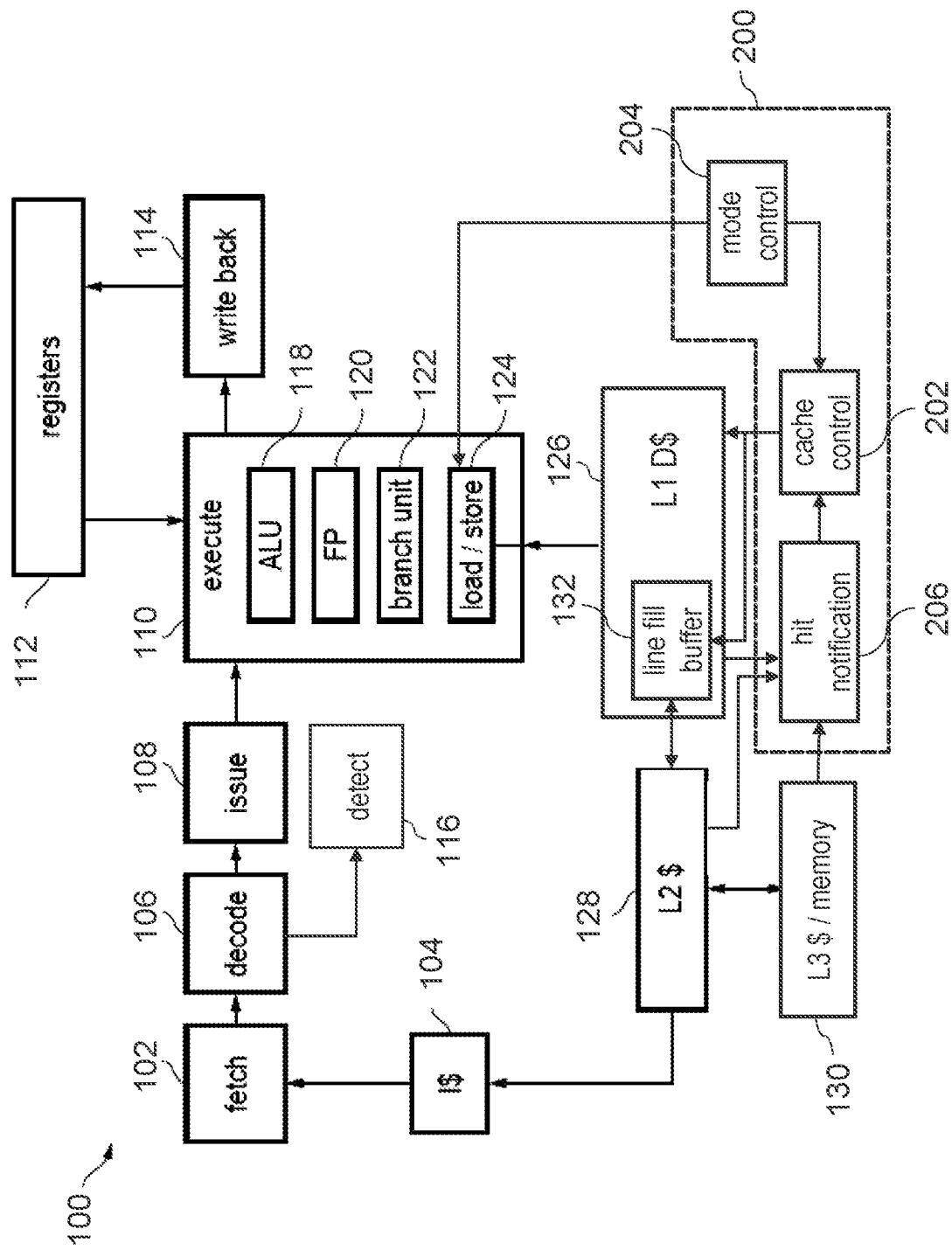
FIG. 1 illustrates a data processing system comprising an apparatus according to one aspect of the present techniques.

Before discussing the embodiments with reference to the accompanying figures, the following description of embodiments is provided.

In accordance with one example configuration, there is provided control circuitry configured to control allocation of a given data item to storage circuitry and storage of the given data item to an intermediate buffer, wherein the intermediate buffer intermediates the storage circuitry and further storage circuitry arranged in a memory hierarchy; hit notification circuitry configured to receive a hit signal indicative of a lookup operation performed in the further storage circuitry resulting in a hit, the lookup operation indicating the given data item, wherein in response to the hit signal, the hit notification circuitry is configured to cause the control circuitry to store the given data item in the intermediate buffer; and mode control circuitry configured to change an operating mode of the control circuitry between an allocation mode and a non-allocation mode, wherein in the allocation mode, the control circuitry is configured to cause the allocation of the given data item from the intermediate buffer to the storage circuitry prior to causing the given data item to be deleted from the intermediate buffer; and in the non-allocation mode, the control circuitry is configured to suppress the allocation of the given data item from the intermediate buffer to the storage circuitry.

In a memory hierarchy, multiple storage circuitries are provided with varying capacities, speeds, or proximity to a processor core. According to the general principle of temporal locality, a computer program has a tendency to repeatedly use data during a window of time. To improve the performance of program execution, recently used data may be stored in storage circuitry that is higher in the memory hierarchy (i.e. smaller, faster and/or closer to the processor core). In this way, data that is most often used can be quickly retrieved from that storage circuitry. Data that is less frequently used is moved lower in the hierarchy (i.e. to storage circuits that are larger, slower and/or further from the processor core).

The inventors of the present invention have realised that specific scenarios exist in which the principle of temporal locality does not apply. In other words, data that is used for a particular part of the computer program is not expected to be used again, at least in the near future. In these scenarios, storing that data in higher level storage circuitry provides little benefit for future performance, and may also bring some disadvantages.

In particular, in examples where the storage circuitry is full, and a new data item is being allocated to the storage circuitry (i.e. a portion of the storage circuitry is designated for storage of the new data item), an existing data item must be evicted to make room. A determination of which existing data item to evict is performed based on an eviction policy, such as the Least Recently Used (LRU) algorithm. In LRU, a data item that has not been used for the longest time is evicted to make room for new data items. Where a new data item is unlikely to be used again and is stored in the storage circuitry, this can lead to the eviction of data that is more useful (e.g. more likely to be used again soon). If the evicted data item were to be required again, it would need to be retrieved from lower in the memory hierarchy. This consumes bandwidth and power, thereby reducing performance of the overall system.

Furthermore, if the previously evicted data item is used again, it would be allocated back to the storage circuitry, causing another eviction of another, potentially useful, existing data item. This process could repeat, causing a cascade of evictions from the storage circuitry. The less useful data item of the abovementioned scenarios would be eventually evicted only when it has not been used for the longest time in accordance with LRU, however, by that time there will have been a significant performance impact including the delays of retrieving data from lower in the memory hierarchy, and increased energy and bandwidth usage from frequent reading and writing of data between storage circuitries.

To this end, the present invention provides control circuitry with operating modes including an "allocation mode" in which the allocation of data to the storage circuitry is performed, and a "non-allocation mode" in which the allocation of data to the storage circuitry is suppressed. In the abovementioned scenarios, the control circuitry can operate in the non-allocation mode, and the existing data in the storage circuitry can be preserved, and the abovementioned energy and bandwidth usage can be reduced.

Suppressing the allocation of a given data item may be implemented using simple signal assertion. In some examples, a binary signal is used by mode control circuitry to assert an override causing the allocation of the given data item to the storage circuitry to not be performed. In other examples, a "mode descriptor" comprising a single bit can be stored in a register. The control circuitry is then configured to read the mode descriptor, and to perform the allocation of the given data item based on the value of the mode descriptor. For example, if the mode descriptor is a zero, then the given data item is allocated, and if the mode descriptor is a one, then the given data item is not allocated. It will be understood that the bit values could be the other way around instead.

An intermediate buffer is provided to intermediate the storage circuitry and further storage circuitry. This is to mean that the given data item that is to be stored in the storage circuitry from the further storage circuitry is first stored to the intermediate buffer to await allocation to the storage circuitry. This need to wait may be caused by other data items needing to be evicted from the storage circuitry before the given data item can be stored. When the allocation of the given data item is performed (i.e. in the allocation mode), the given data item is deleted from the intermediate buffer. The deletion may be part of a move operation from the intermediate buffer to the storage circuitry, or the given data item may be copied to the storage circuitry and subsequently deleted (e.g. by being invalidated or overwritten) as separate operations. On the other hand, when the allocation of the given data item is suppressed (i.e. in the non-allocation mode), the given data item remains in the intermediate buffer until it is deleted or overwritten. While in the intermediate buffer, the given data item can still be accessed (e.g. read).

The given data item is stored to the intermediate buffer in response to a memory access instruction specifying the memory address of the given data item. A lookup may be performed in the storage circuitry and further storage circuitry in order to retrieve the given data item from the memory hierarchy. If the given data item is located in the further storage circuitry, a hit signal is output to indicate a hit, and the given data item is stored to the intermediate buffer. In some examples, this indication may comprise a binary signal, where a one corresponds to a hit and a zero corresponds to a miss. In other examples, further data may be included in the hit signal, such as the location of the given data item in the further storage circuitry or the given data item itself.

In some examples, the mode control circuitry is configured to change the operating mode of the control circuitry to the non-allocation mode in response to a memory block instruction, wherein the memory block instruction specifies a block of memory. A memory block instruction can be decoded into a number of load operations together with one or more other operations performed on some or all of the data loaded by the load operations. The other operation(s) might be a store or a comparison for instance. The load operations collectively access each data item in the block of memory, and write each data item to one or more registers. It will be appreciated that, since each data item is loaded for the purpose of performing the other operation, once the other operation is performed, the loaded data is unlikely to be reused in the near future. By changing the operating mode of the control circuitry in response to memory block instructions, it is possible to inhibit the data from being loaded into the storage circuitry while still enabling the other operation(s) to be performed on that data. This thereby reduces unnecessary allocations and evictions caused by the allocation of data that is not imminently reused.

In some examples, the mode control circuitry is configured to change the operating mode of the control circuitry to the allocation mode in response to completion of the memory block instruction. In such examples, completion of the memory block instruction is used to mark the end of data being loaded that will not be imminently reused. Therefore, the operating mode can change back to the allocation mode, in order to take advantage of being able to allocate data to the faster storage circuitry. In some examples, completion may be considered to take place when the instruction has been executed by the execution units. In other examples, completion may be considered to have occurred at a time of writeback.

In some examples, there is provided detection circuitry configured to detect a sequence of load instructions, wherein the load instructions collectively specify a block of memory, wherein in response to detecting the sequence of load instructions, the detection circuitry is configured to cause the mode control circuitry to change the operating mode of the control circuitry to the non-allocation mode. In such examples, instead of one instruction specifying a block of memory (as with a memory block instruction), a sequence of individual instructions collectively specifies a block of memory. For example, each instruction in the sequence specifies successive contiguous portions of the block. Detection circuitry is provided to detect when such a sequence of load instructions is being executed, and causes the mode control circuitry to change the operating mode to the non-allocation mode. In some examples, the detection circuitry tracks incoming instructions to determine if they indicate memory addresses at regular intervals, and whether the interval is equal to the amount of data that can be loaded at once. Similarly to when executing memory block instructions, the data that is loaded in response to the sequence of load instructions is likely to only be used once. As a result, the operating mode of the control circuitry is changed to the non-allocation mode when executing such sequences of instructions in order to avoid unnecessary eviction of data from the storage circuitry.

In some examples, there is provided load circuitry configured to perform a load operation indicating the given data item, wherein in the non-allocation mode, the mode control circuitry is configured to cause the load circuitry to perform the load operation in the intermediate buffer. Since the given data item is not allocated to the storage circuitry when the control circuitry is in the non-allocation mode, the given data item remains in the intermediate buffer. Consequently, a load operation performed in respect of the given data item causes the intermediate buffer to be searched for the given data item. In some embodiments, the intermediate buffer is only searched in the non-allocation mode whereas in other embodiments, it is always searched. In some embodiments, the storage circuitry is searched first.

In some examples, the intermediate buffer comprises a line fill buffer; and a cache comprises the storage circuitry and the intermediate buffer. A line fill buffer can be used for tracking fill requests that result from misses in a cache. It is therefore possible to use the line fill buffer itself as the intermediate storage, which therefore intermediates the result of that cache and the further storage circuitry (a lower level of the memory hierarchy).

In some examples, the line fill buffer is configured to store a cache line comprising a plurality of data items, the plurality of data items including the given data item and at least one further data item; load count circuitry configured to count a number of load operations indicating at least one of the plurality of data items; and in response to the number of load operations being equal to a number of data items in the plurality of data items, the load count circuitry causes the line fill buffer to delete the cache line. While the line fill buffer may make more efficient use of storage by storing cache lines comprising multiple data items, load operations typically only relate to a part of a cache line, for example, the first 64 bits of a 64 byte cache line. By tracking the number of load operations indicating data items in a particular cache line, it is possible to determine when every data item in a cache line has been loaded, and thus when the cache line is no longer needed. Once that determination is made, the cache line is deleted by invalidating or overwriting it in the line fill buffer.

In some examples, the load count circuitry comprises a counter configured to increment or decrement in response to a load operation being performed, wherein the load operation indicates at least one of the plurality of data items; and the counter is configured to reset in response to the line fill buffer deleting the cache line. The number of load operations are counted for each cache line individually. Therefore, cache lines with varying numbers of data items are supported. The counter is able to count upwards or downwards. In such examples, it is assumed that the given data item is expected to be used only once. In other examples, where the given data item is expected to be used more than once, the count circuitry would require modification to account for multiple load operations indicating the same data item from the plurality of data items. For brevity, the techniques disclosed herein primarily focus on loading data items that are only expected to be used once. It will be appreciated that where the intermediate buffer is able to store a number of cache lines, an equal number of counters can be provided in order to determine when each stored cache line can be deleted.

In some examples, there is provided flush circuitry configured to trigger a flush, wherein if the number of load operations is less than the number of data items in the plurality of data items, the flush circuitry is configured to suppress flushing the load operations indicating one of the plurality of data items until the line fill buffer deletes the cache line. A memory access instruction may be executed speculatively, for example, if it was executed after a branch instruction, but before a final determination of whether the branch was taken or not. In the case of a misprediction, it is preferable for the flush to encompass data that has been added to the line fill buffer by the present technique. This can be achieved by delaying the flush until entries that have been added to the line fill buffer by the present technique have been removed (e.g. by using the counters described above).

In some examples, a cache comprises the storage circuitry and a further cache comprises the further storage circuitry; and the cache and the further cache are subject to an exclusive cache policy. This is to mean that data items can only be stored in one cache at a time. In other words, if a data item is allocated to the cache from the further cache, that data item would be deleted from the further cache as part of the allocation to the cache. This does not necessitate that the data item is deleted from the further cache when the data item is stored to the line fill buffer, but not yet allocated to the cache (e.g. in the non-allocation mode).

In some examples, there is provided first prefetching circuitry configured to prefetch a future data item based on a predicted load operation and to store the future data item in the storage circuitry; and the mode control circuitry is configured to control the first prefetching circuitry based on the operating mode of the control circuitry, wherein the allocation mode, the mode control circuitry is configured to enable the first prefetching circuitry; and in the non-allocation mode, the mode control circuitry is configured to disable the first prefetching circuitry. The first prefetching circuitry prefetches data to the storage circuitry in advance of it being explicitly required. The predicted load operation is based on, for example, a pattern of previous load operations. Prefetching allows for data to be available in the storage circuitry more often, such that the data is quickly available once the data is explicitly required. However, as described above, in the non-allocation mode, the allocation of data to the storage circuitry is suppressed, thereby reducing or eliminating replacement and eviction from the storage circuitry. Another source of evictions is through prefetching in which data is prefetched and allocated in the storage circuitry. To further reduce or eliminate such evictions, the first prefetching circuitry is deactivated in the non-allocation mode.

In some examples, there is provided second prefetching circuitry configured to prefetch the future data item based on the predicted load request and to store the future data item in the further storage circuitry; the first prefetching circuitry is configured to prefetch the future data item from the further storage circuitry, after the future data item has been stored in the further storage circuitry by the second prefetching circuitry, wherein the mode control circuitry is configured to enable the second prefetching circuitry in the non-allocation mode. The second prefetching circuitry may prefetch data to the further storage circuitry in a similar way as the first prefetching circuitry. However, since the future data item is stored in the further storage circuitry in the non-allocation mode, the performance benefits of prefetching data can be retained in the non-allocation mode.

Particular embodiments will now be described with reference to the figures.

FIG. 1 illustrates a general overview of a data processing system 100 incorporating the apparatus 200 according to the present techniques. The data processing system 100 comprises various pipeline stages including fetch circuitry 102 for fetching program instructions from memory or from an instruction cache 104, decoding circuitry 106 for decoding fetched instructions, issue circuitry 108 to issue queued instructions to execution circuitry 110 for execution. Registers 112 are provided to store and operate on instruction operands via the write back circuitry 114.

The execution circuitry 110 comprises various different data processing circuitries such as arithmetic-logic circuitry 118, floating-point circuitry 120, a branch unit 122 and load/store circuitry 124. The load/store circuitry 124 is used to perform load operations, and connects to a memory hierarchy comprising a number of storage circuitries including caches and a main memory. In the example of FIG. 1, an L1 data cache 126 is arranged as the closest cache to the execution circuitry 110. The L1 data cache 126 also has the smallest capacity, resulting in the L1 data cache 126 being the fastest to look up. A larger and/or slower L2 cache 128 is also provided to store data that has been evicted from the L1 data cache 126. Data evicted from the L2 cache 128 is stored into an L3 cache or written back to main memory 130.

In the context of this example, part of the L1 data cache 126 corresponds to the storage circuitry, and the L2 cache 128 corresponds to the further storage circuitry according to the terminology of the present techniques set out in the appended claims. However, it will be appreciated that other memory configurations are possible. In various examples, the storage circuitry and further storage circuitry may correspond to the L2 cache 128 and the L3 cache 130 respectively, or to the L1 data cache 126 and main memory respectively.

The L1 data cache 126, L2 cache 128 and L3 cache 130 are subject to an exclusive cache policy, which enforces that only a single copy of a data item is present in the caches at a time. In other words, once a data item has been moved from the L2 cache 128 to the L1 cache 126, the copy that was initially stored in the L2 cache 128 is deleted or invalidated. In will be appreciated that the present techniques are not limited to an exclusive cache policy. Indeed, the caches may be subject to any other cache policy such as an inclusive cache policy or a Non-Inclusive, Non-Exclusive ('NINE') policy.

When data from the L2 cache 128 is allocated to the L1 data cache 126, the data is initially written to an intermediate buffer (and hence the intermediate buffer intermediates the L1 data cache 126 and the L2 cache 128). The intermediate buffer in the example shown in FIG. 1 is embodied as a line fill buffer 132, which forms part of the L1 data cache 126. The line fill buffer 132 is used to store cache lines until they can be stored to the L1 data cache 126. The line fill buffer 132 uses the same data pathways that the load/store circuitry 124 uses to access the L1 data cache 126 during a lookup operation. This means that the line fill buffer 132 can be searched (e.g. as part of a lookup operation) in the same way as the rest of the L1 cache 126. Note that although the line fill buffer 132 intermediates the storage of the L1 cache 126 and the L2 cache 128, it is not obligatory that the intermediate buffer forms part of the L1 cache 126 as shown in FIG. 1.

The apparatus 200 according to the present techniques is incorporated into the data processing system 100 described above. The apparatus 200 comprises cache control circuitry 202 which controls the allocation of data to the L1 data cache 126 and storage of data to the intermediate buffer 132. The cache control circuitry 202 is capable of operating in different operating modes, including an allocation mode and a non-allocation mode that will be described in detail later. The operating modes are selectable by mode control circuitry 204 in response to different events or signals that may be detected.

The apparatus 200 comprises hit notification circuitry 206 which receives a hit signal when a lookup operation results in a hit. The hit signal indicates that a look up operation was performed specifying a particular data item, and that data item was found when searching one of the elements of the memory hierarchy. The hit notification circuitry 206 causes the cache control circuitry 202 to store that data item to the line fill buffer 132 to await allocation to, in this example, the L1 data cache 126.

Allocation of the data item to the L1 data cache 126 includes designating part of the cache memory (e.g. one or more entries) for storage of the data item. This is useful when data is expected to be used again in the near future, since the data can be quickly retrieved by a lookup operation in the L1 data cache 126. Allocation of data to the L1 data cache 126 is done when the cache control circuitry 202 is operating in the allocation mode. However, there are scenarios where it is particularly unlikely that that data would be used again in the near future. In such scenarios, there is little benefit to storing that data in the L1 data cache 126. In fact, doing so could require existing, potentially more useful data to be evicted from entries in the L1 data cache 126 that are designated to store the new data. The evicted data would be written to the L2 cache 128, potentially causing a further eviction of data to an L3 cache or memory 130. Therefore, it would be advantageous to suppress allocation of data to the L1 data cache 126, while still making the data available to the load/store circuitry 124. To do so, the functionality of the non-allocation mode according to the present techniques is used.

Figure 2A:
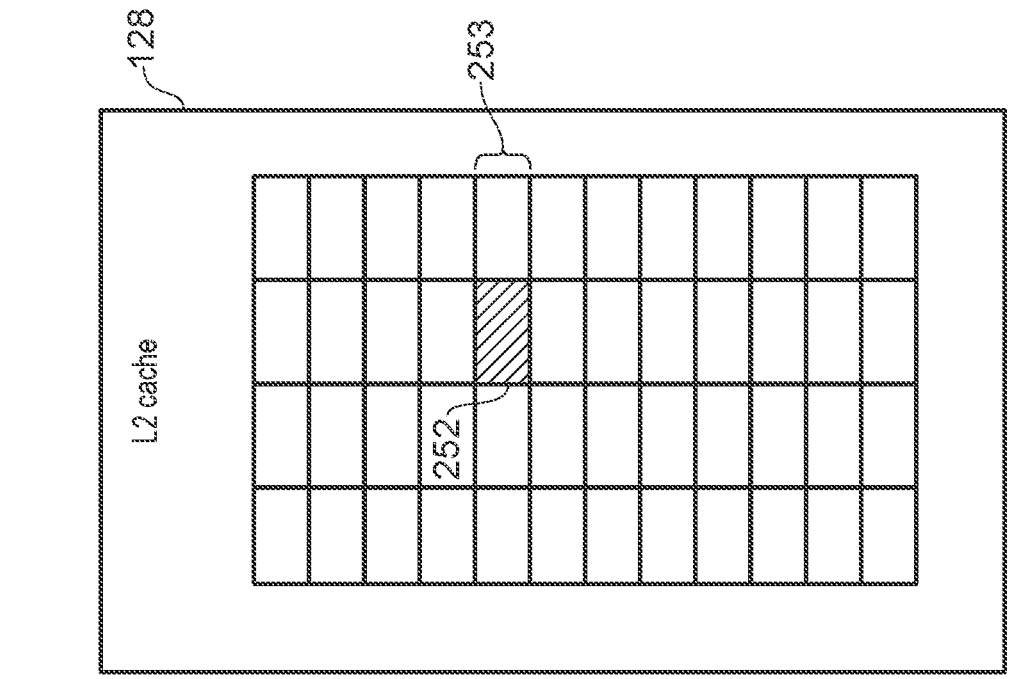
FIGS. 2A-2E illustrate the flow of data through a cache hierarchy.
Figure 2A:
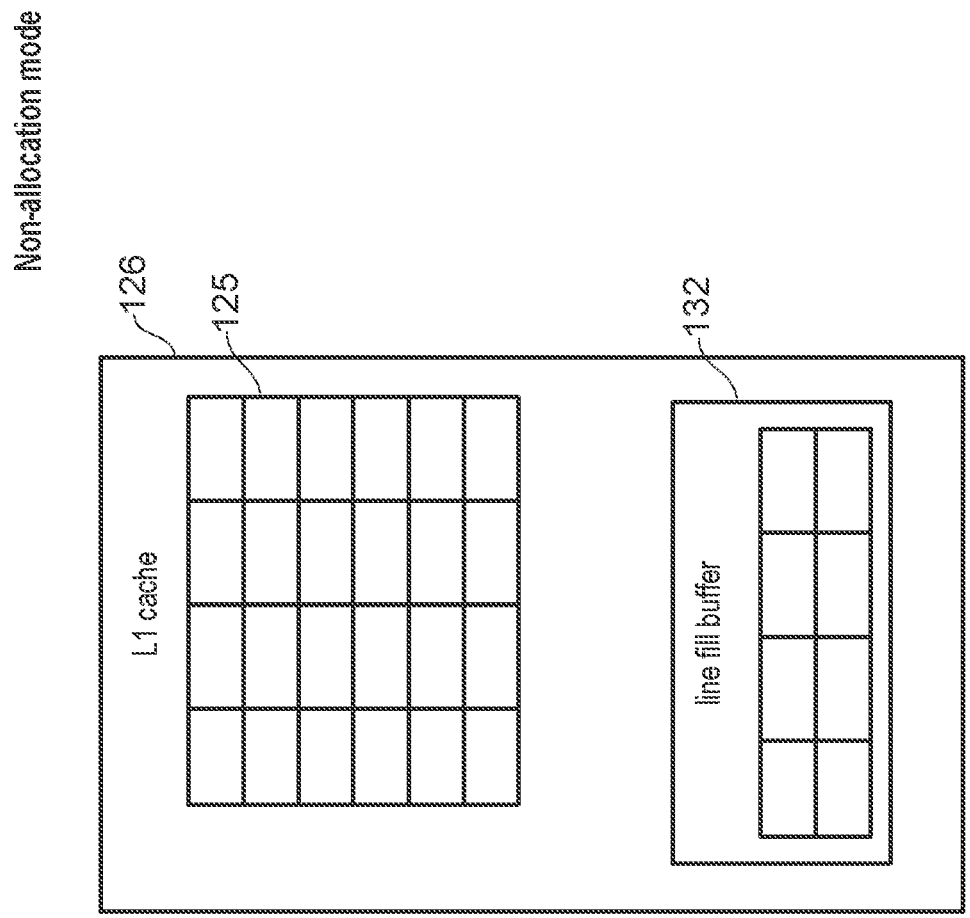
Figure 2B:
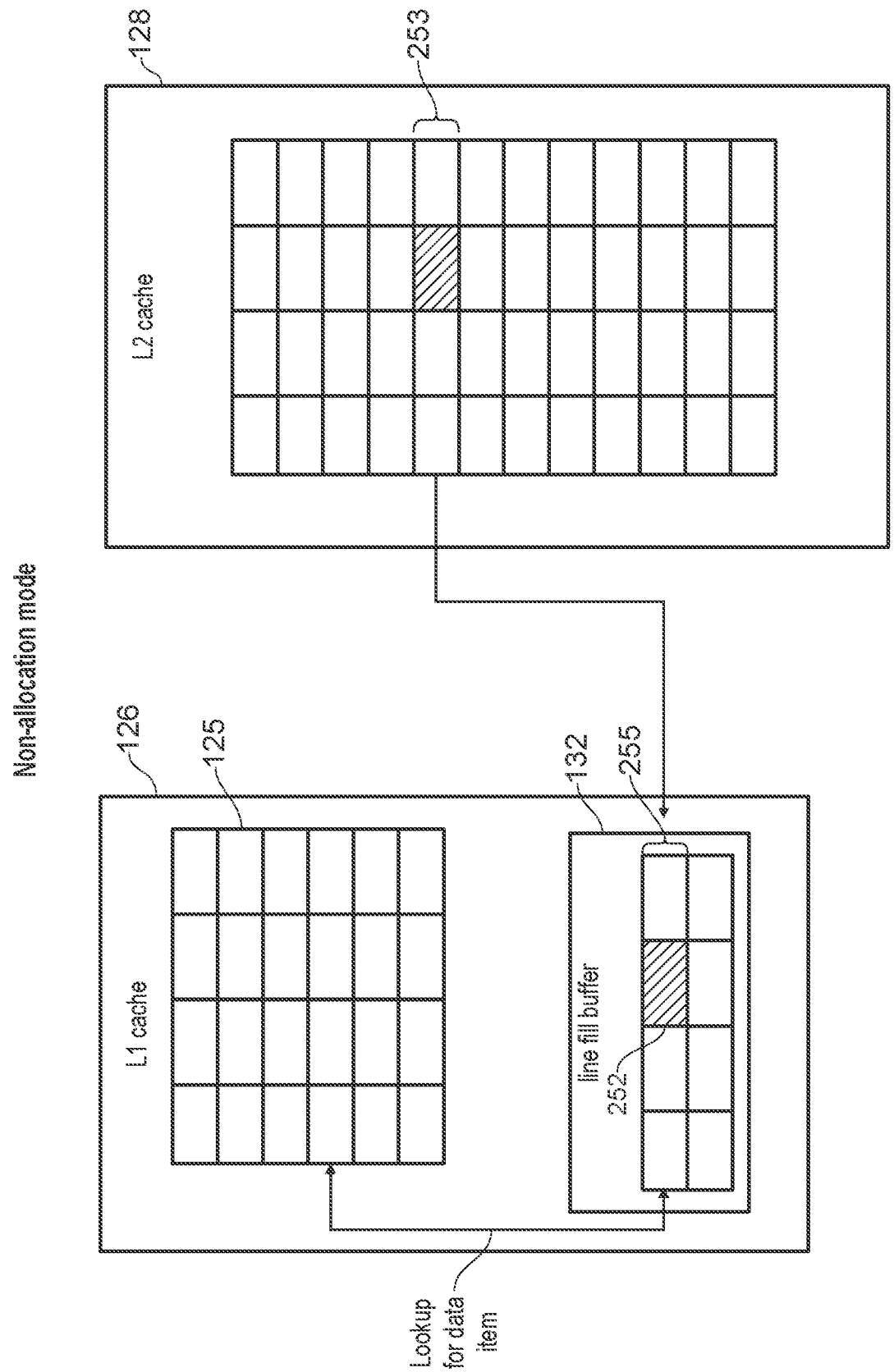
Figure 2C:
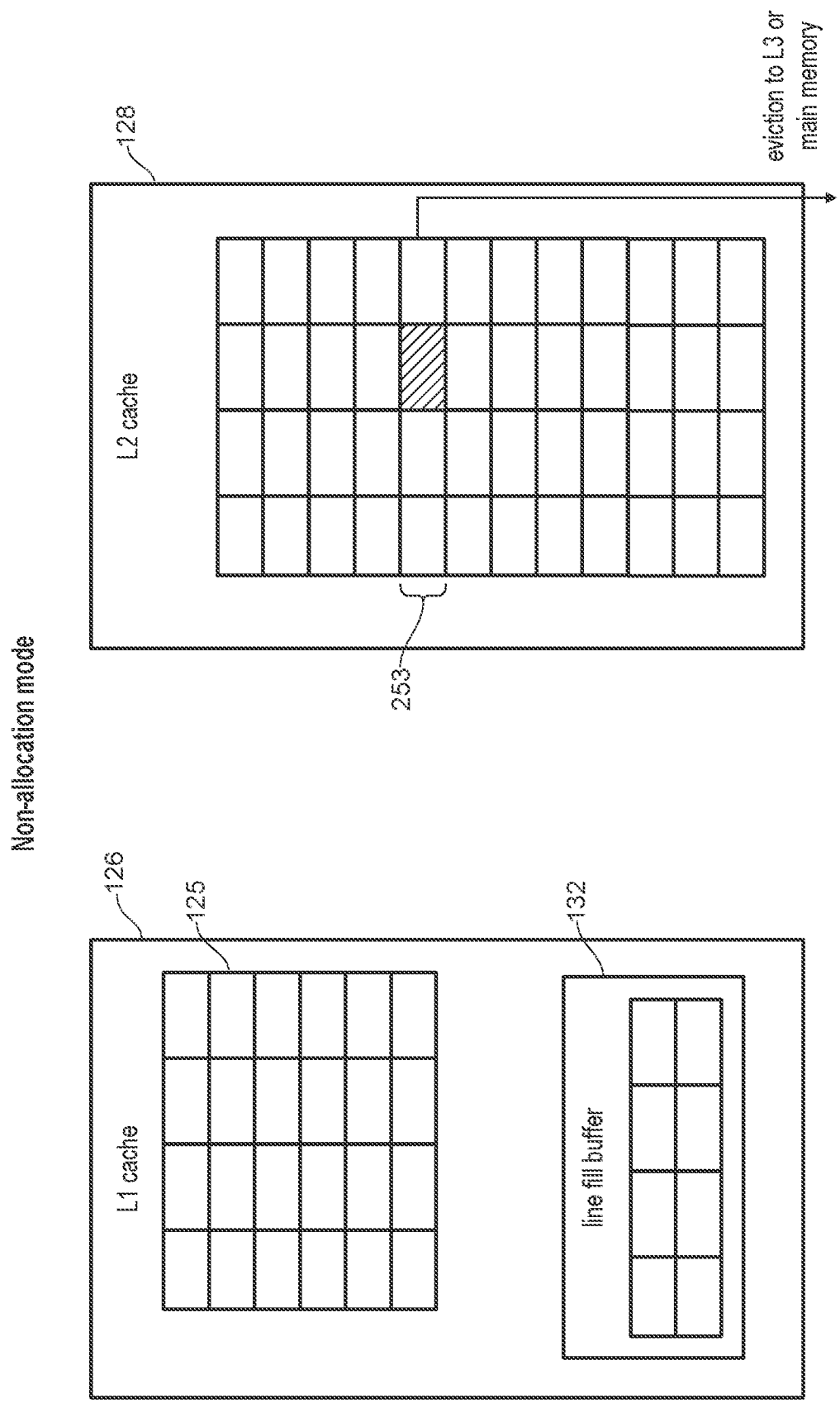
Figure 2D:
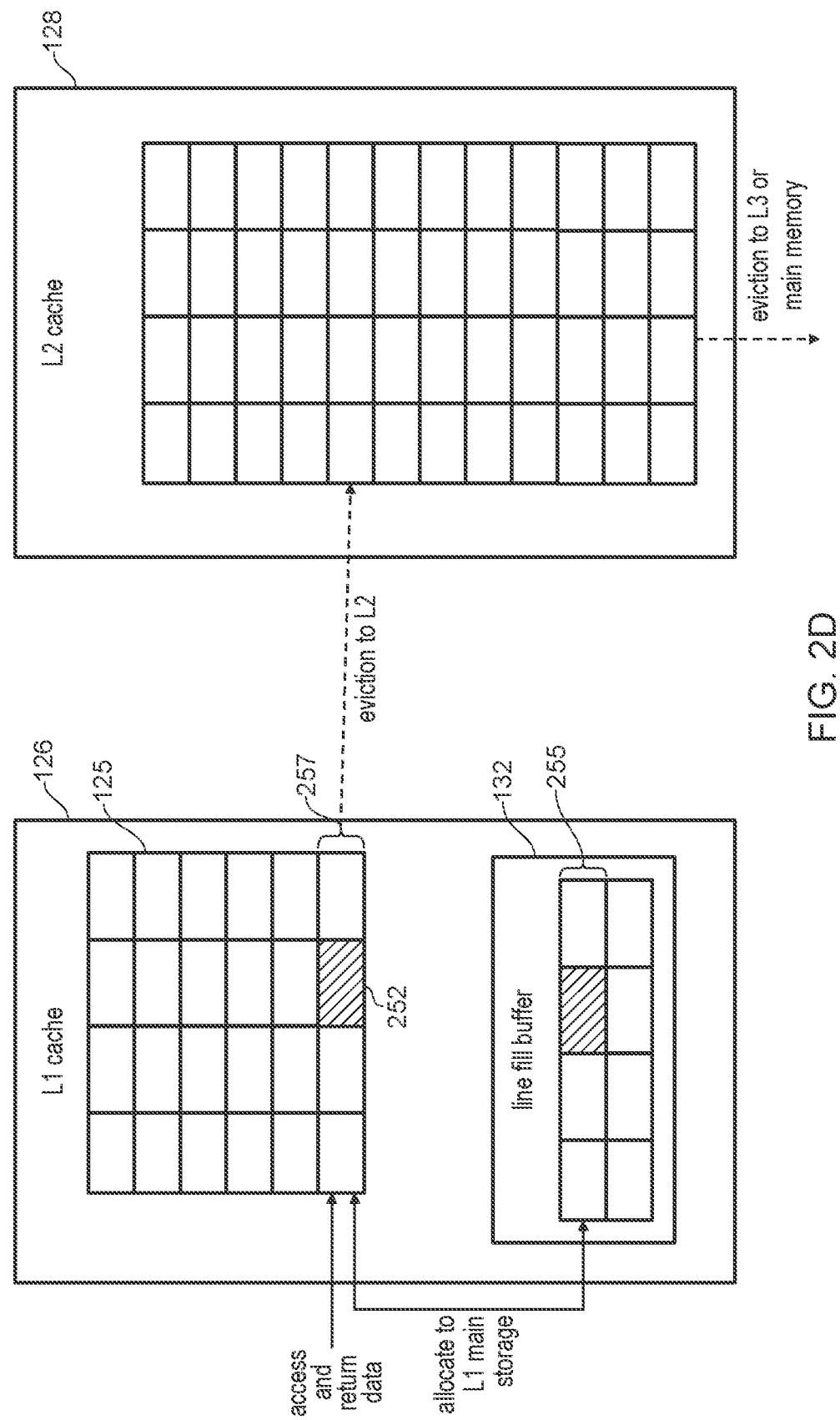
Figure 2E:
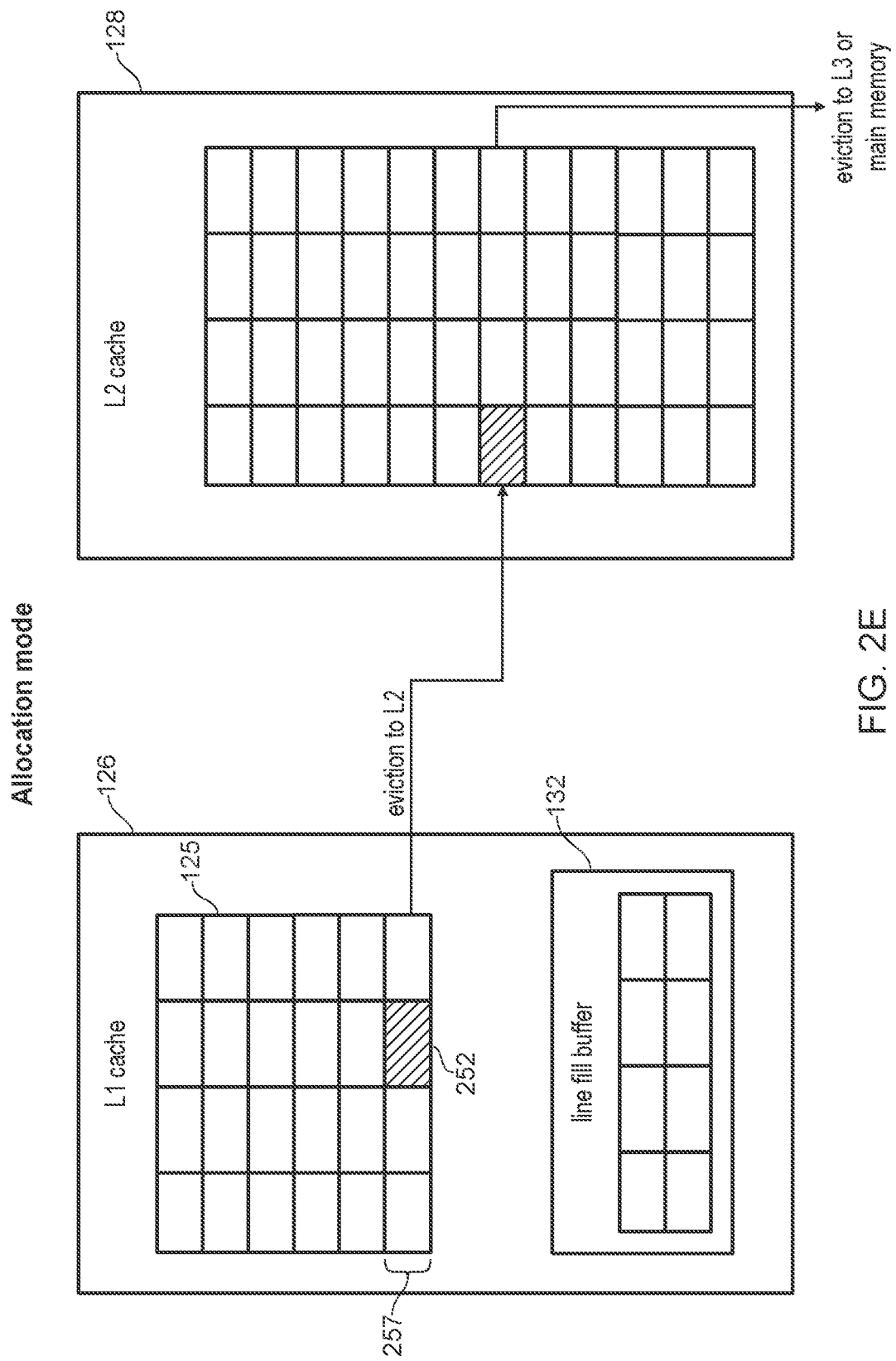

FIGS. 2A-2C illustrate the movement of data through a cache hierarchy including the L1 cache 126 and the L2 cache 128, while the cache control circuitry 202 is operating in the non-allocation mode. FIGS. 2D-2E illustrate the movement of data through the cache hierarchy while the cache control circuitry 202 is operating in the allocation mode. FIGS.

2A-2E illustrate an L1 cache 126 containing a storage area 125 and a line buffer 132, and a L2 cache 128. The storage area 125 of the L1 cache 126 can store 6 cache lines, while the L2 cache 128 can store 12 cache lines. The line fill buffer 132 is the smallest with a capacity of only two cache lines. In these examples, the cache lines each store four 64-bit values (and thus are 32 byte cache lines). It will be understood that these components are not limited to these respective capacities, and may have any capacity depending on the particular implementation.

In FIG. 2A, a lookup operation is performed in the L2 cache 128 to locate a given data item 252. The given data item 252 forms part of a cache line 253 of the L2 cache 128. The lookup operation may be performed in parallel with a lookup operation in the L1 cache 126 or after a miss in the L1 cache 126. In either event, in this example, the given data item 252 is not stored in the L1 cache 126 already. The lookup operation in the L2 cache 128 results in a hit because the given data item 252 is stored as part of the cache line 253 in the L2 cache 128 (potentially as a consequence of prefetching into the L2 cache 128). A hit notification is issued to hit notification circuitry 206. The hit notification can be any signal that is interpreted to indicate a hit. For example, the hit notification may be a single bit, where a one corresponds to a hit and a zero corresponds to a miss.

As a consequence of the hit occurring in the L2 cache 128, the data item 252 is returned and written to the registers 112. In addition, the cache line 253 containing the data item 252 is inserted from the L2 cache 128 into the line fill buffer 132 in the L1 cache 126, as shown in FIG. 2B.

The example of FIG. 2B considers the situation in which the cache control circuitry is operating in the non-allocation mode. Consequently, allocation of the cache line 255 from the fill buffer 132 to the storage area 125 of the L1 cache 126 is suppressed and so no existing data needs to be evicted from the storage area 125 of the L1 cache 126.

In FIG. 2C, the cache line 255 in the line fill buffer 132 that contains the given data item 252 is invalidated, marked for overwriting or otherwise deleted from the line fill buffer 132 after the given cache line 253 has been 'consumed' by the load/store circuitry 124 (e.g. by each data item within the cache line 253 being stored to registers 112). Eventually, as new data is allocated to the L2 cache 128 the given data item 252 is evicted from the L2 cache 128 (e.g. to an L3 cache or to main memory 130) as indicated by an eviction policy (e.g. LRU).

Thus, in the non-allocation mode, no evictions need to take place within the main storage area 125 of the L1 cache 126. Instead, the cache line is stored to the line fill buffer 132. Since the line fill buffer 132 can be searched as part of any lookup occurring within the L1 cache 126, each of the data values within the cache line can be accessed at a similar speed to that which cache lines in the main storage area 125 can be accessed. The reduction in evictions means that bandwidth usage by reads/writes between the caches is reduced and the energy usage of allocating or evicting data is also reduced. This in turn improves data throughput when in the non-allocation mode.

Note that in the above example, the cache line in the L2 cache 128 is not invalidated when the cache line moves into the line fill buffer 132. In some architectures, the exclusive cache policy may normally prohibit the same cache line existing in both the line fill buffer 132 and the L2 cache 128. In that situation, a special signal can be asserted to the L2 cache 128 that a non-invalidating read is being performed in the non-allocation mode in order to enable this behaviour.

As shown in FIG. 2D, in the allocation mode, the cache line 255 that had been stored to the line fill buffer 132 is allocated to a cache line 257 of the L1 cache 126. This potentially causes an eviction of an older cache line from the L1 cache 126 to the L2 cache 128, which may further cause an eviction of another older cache line from the L2 cache 128 to the L3 cache or main memory 130. After the cache line 257 containing the given data item 252 has been allocated and stored to the main storage area 125 of the L1 cache 126, the cache line 253 in the line fill buffer 132 is deleted, overwritten, or marked invalid.

In FIG. 2E, when the cache line 257 containing the given data item 252 is no longer needed (e.g. as indicated by an eviction policy), it is evicted. The cache line 257 containing the data item 252 is then stored to the L2 cache 128, and eventually evicted to the L3 cache or main memory 130.

Figure 3:
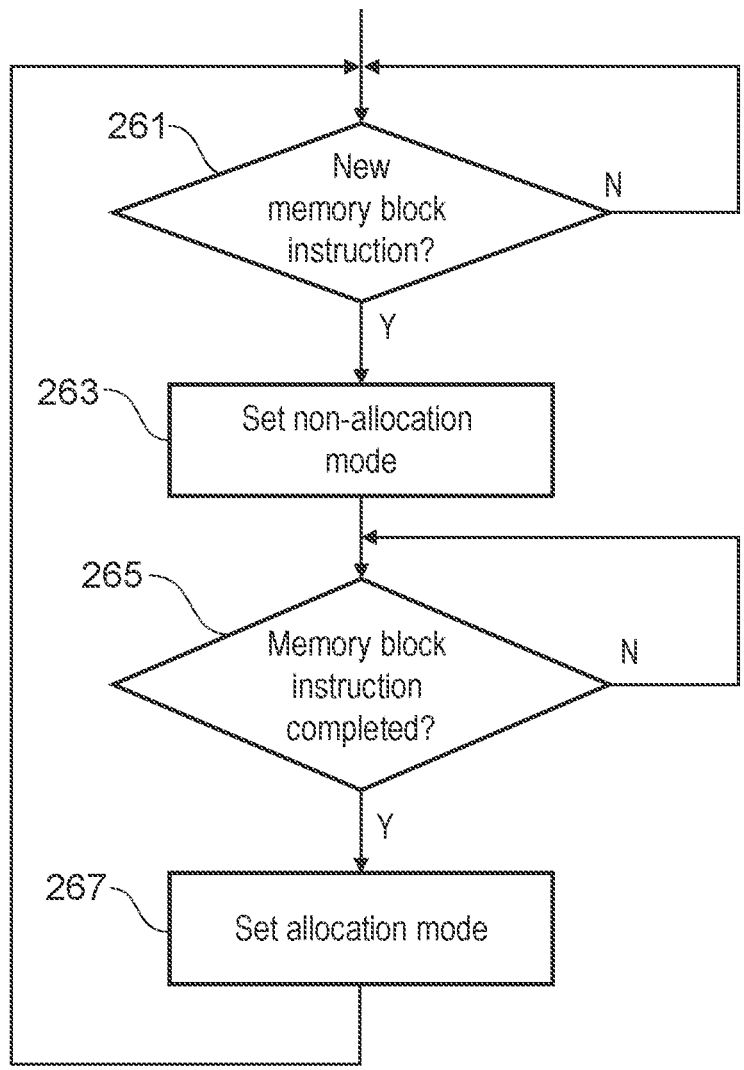
FIG. 3 illustrates a mode change.

FIG. 3 illustrates a mode change. At a step 261 it is determined whether a new memory block instruction has been encountered. That is, whether a new memory block instruction is being executed. This can be determined by use of the detection circuitry 116 or by analysing the issue queue 108. If not, then the process repeats. Note that this detection could be of a literal memory block instruction or an emulated memory block instruction achieved through a sequence of separate load instructions (as illustrated with respect to FIG. 5B). If a new memory block instruction is being executed then at step 263, the non-allocation mode is set. Then at step 265, it is determined whether the memory block instruction is finished/completed. Again, this can be analysed by viewing the pipeline, particularly the issue queue 108. If not, the process loops at step 265 until it is. Then, at step 267, the allocation mode is set. The process then returns to step 261.

Figure 4:
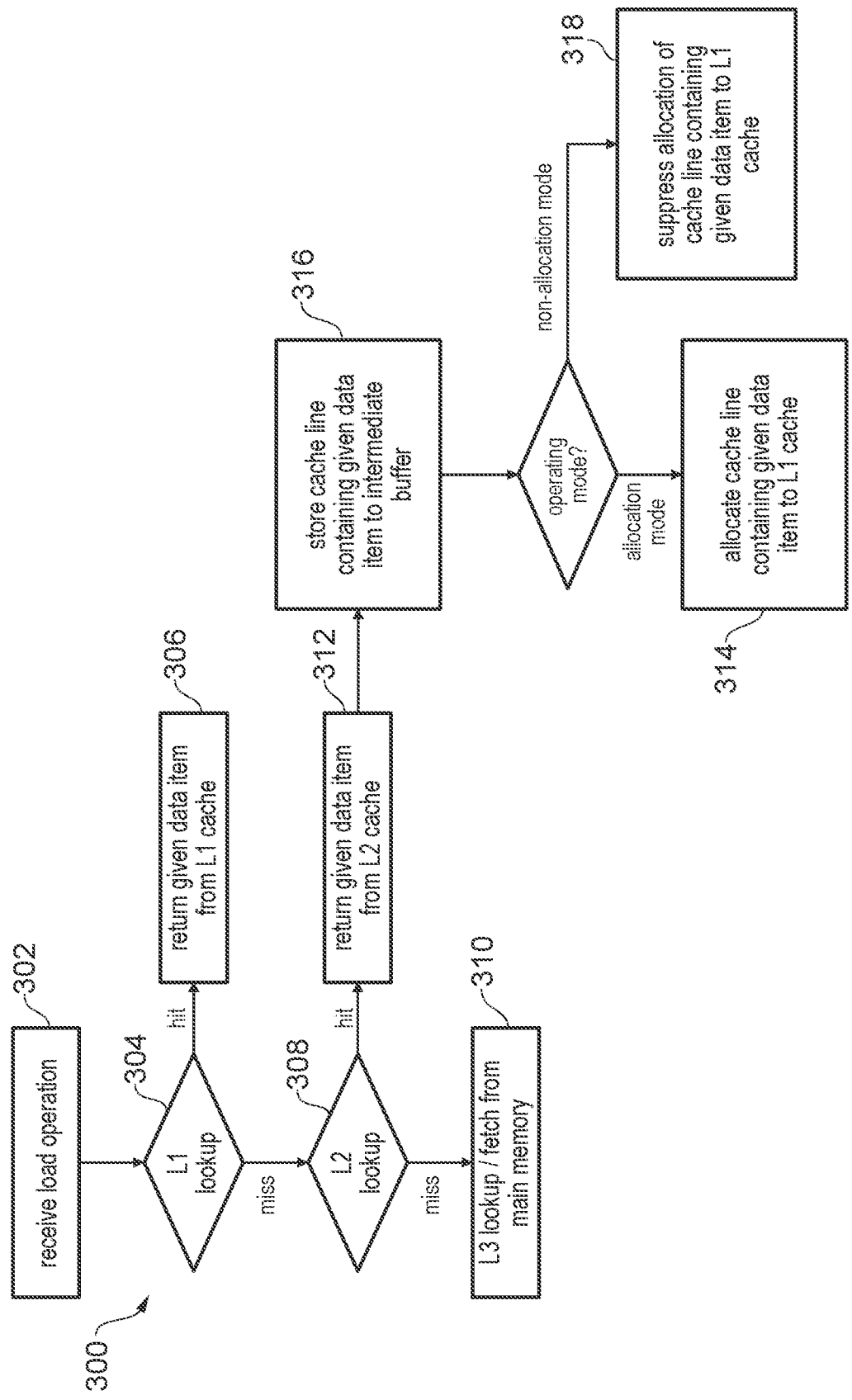
FIG. 4 illustrates a flow diagram for loading data according to one aspect of the present techniques.

FIG. 4 illustrates a flow chart for the method 300 corresponding to the examples shown in FIGS. 2A-2E. Firstly, at step 302, a load operation is received by the load/store circuitry 124, which then begins the process of looking up a cache hierarchy including the L1 cache 126 and the L2 cache 128. In step 304, an L1 lookup is performed in the L1 cache 126. A lookup performed in the L1 cache 126 also includes a lookup in the line fill buffer 132. If the given data item 252 is already in the L1 cache 126 or the line fill buffer 132, then the lookup results in a hit, and the load/store circuitry 124 returns the data from the L1 cache at step 306.

If the lookup operation in the L1 cache 126 results in a miss, an L2 lookup is performed in the L2 cache 128 at step 308. If the L2 lookup results in a miss, then at step 310, a further lookup is performed in a next storage circuit of the memory hierarchy (e.g. a L3 cache, or main memory). In some examples, an L1 lookup, L2 lookup and further lookups (e.g. L3 lookup or main memory access) may be performed in parallel.

If the L2 lookup in the L2 cache 128 results in a hit, then the given data item 252 is returned to the load/store unit at step 312, and the cache line containing the given data item 252 is stored in the line fill buffer 132 at step 316. The steps that follow depend on the operating mode of the cache control circuitry 202. If the cache control circuitry 202 is operating in the allocation mode, then at step 314, the cache line containing the given data item 252 is allocated to the main storage area 125 of the L1 cache. In some examples where the cache hierarchy is configured to operate with an exclusive cache policy, step 314 may also include deleting or invalidating the cache line containing the given data item 252 from the L2 cache 128. If the cache control circuitry 202 is operating in the non-allocation mode, then at step 318, the allocation of the cache line containing the given data item 252 to the L1 cache 126 is suppressed.

As described above, switching between the allocation mode and the non-allocation mode can be performed depending on whether the given data item 252 is expected to be used again in the near future, or if it will only be used once. To accommodate this, the mode control circuitry 204 is configured to change the operating mode of the cache control circuitry 202 in dependence on incoming instructions received by the decoding circuitry 106. In particular, the decoding circuitry 106 supports handling of memory block instructions, which specify a block of memory. A block of memory may be specified by, for example, identifying a start address and a memory block length, or by identifying a start address and an end address. A memory block instruction is used to perform memory operations across the specified block of memory.

In some examples, the memory block instruction may be a memory copy instruction, which causes data from one block of memory to be copied to another block of memory. This can be specified, for example, with two start addresses and a total copy size. In other examples, the memory block instruction may be a memory compare instruction, which causes data from one block of memory to be loaded and compared against data loaded from another block of memory.

Figure 5A:
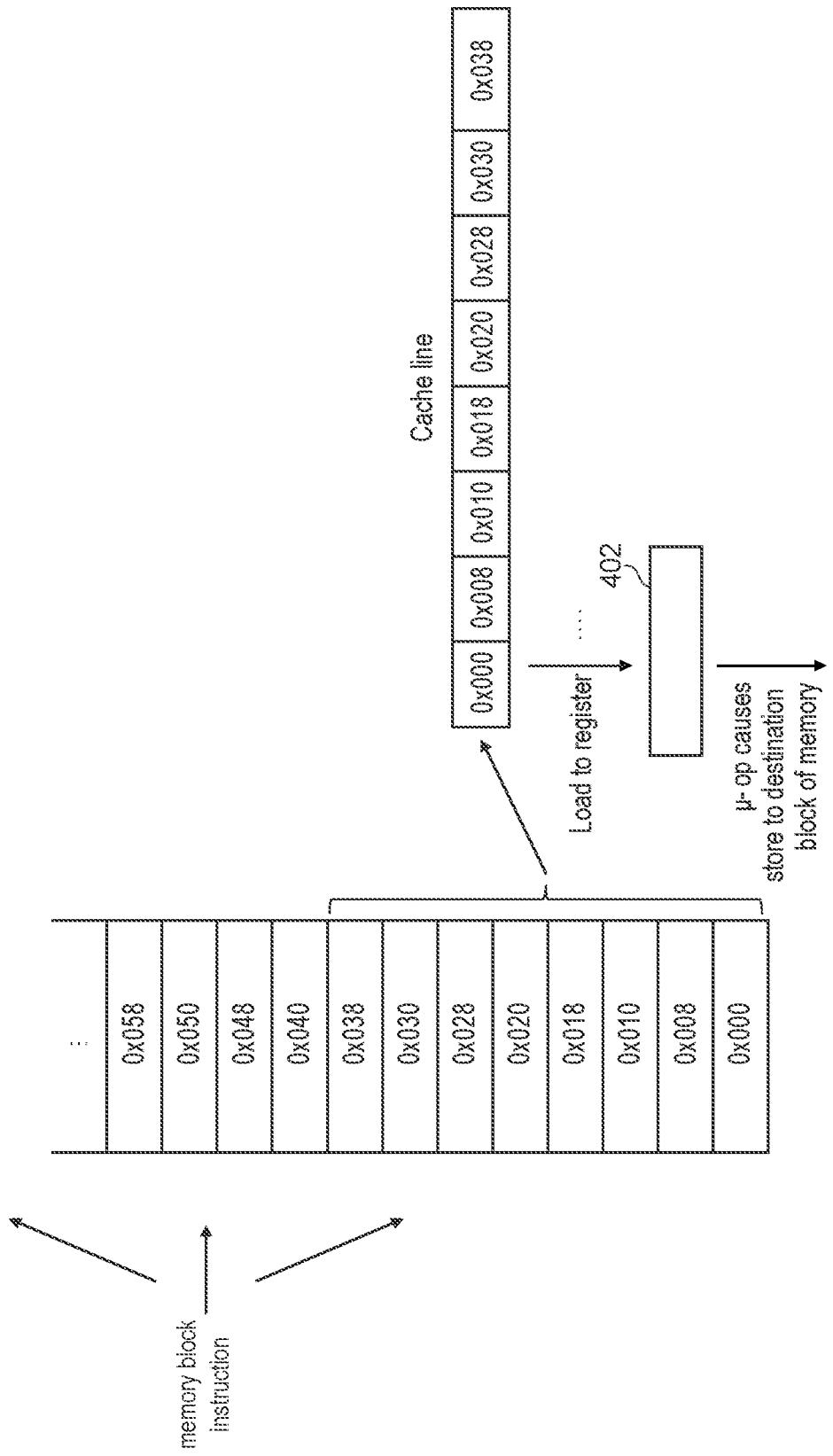
FIGS. 5A and 5B illustrate a comparison between a memory block instruction and a sequence of load instructions.

FIG. 5A illustrates an example memory block instruction in the form of a memory copy instruction. The memory copy instruction specifies a source block of memory and a destination block of memory, and causes the data from the source block to be copied to the destination block.

When a memory copy instruction appears in a program code, the decoding circuitry 106 decodes the memory copy instruction into a number of micro-operations (u-ops), each of which causes an individual portion of the source block of memory to be copied at a time. In this example, each u-op is configured to copy a block corresponding to eight 64 bit values (which can collectively be stored within a single 64 byte cache line). This is achieved by copying each 64-bit value (the bit-width of a register 402 in the registers 112) one at a time. When the first 64-bit value of the block is loaded, this will cause the entire block to be fetched from the memory hierarchy as a cache line in the manner described in FIGS. 2A-2C for instance. Each of the 64-bit values can then be accessed by reading directly from the cache line in the line fill buffer 132 to the register 402 and then from that register 402 to the destination block of memory.

Other types of memory block instruction can also be used with the present technique, such as memory compare instructions.

Figure 5B:
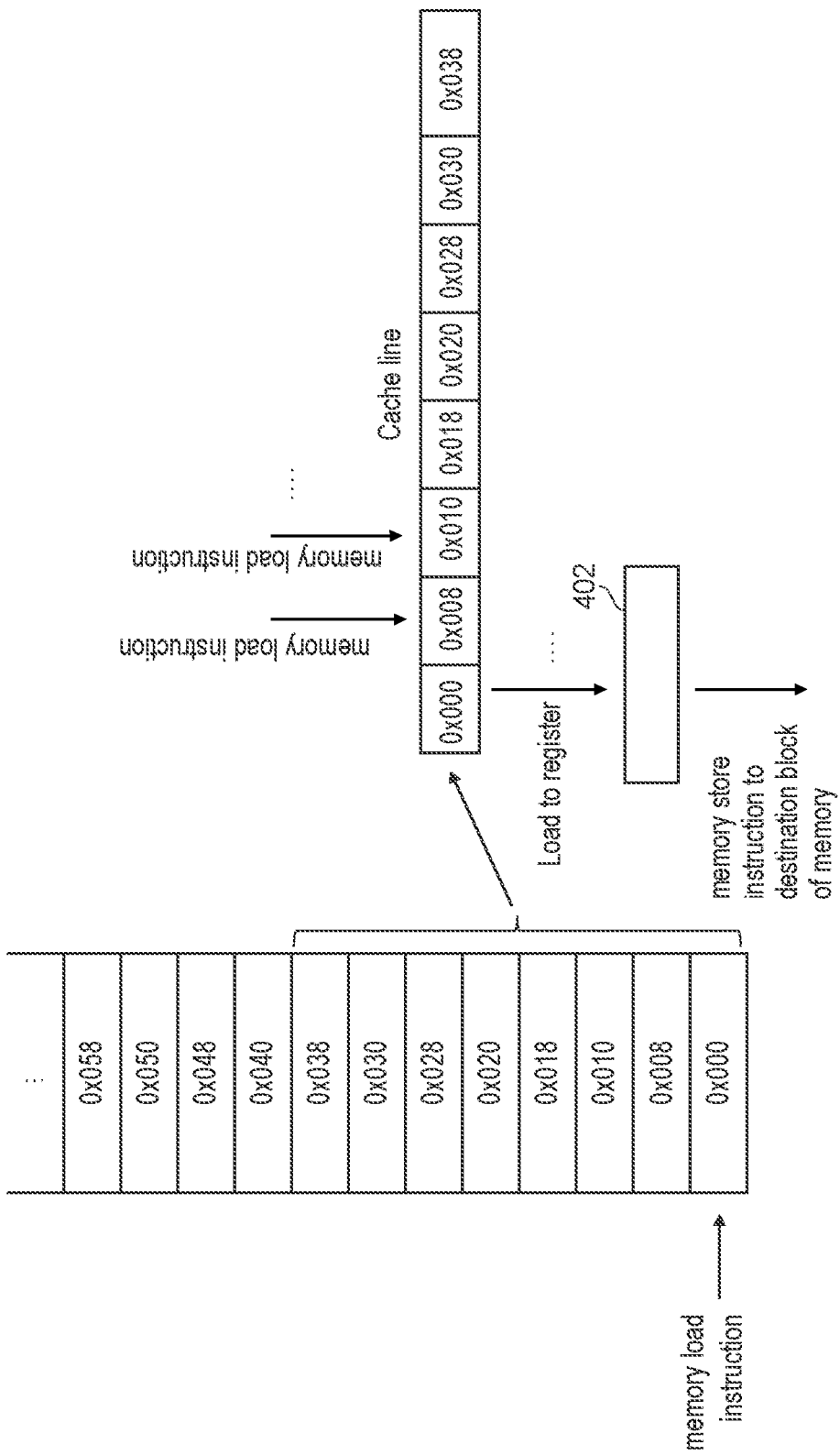

The present technique is also applicable to the emulation of a memory block instruction by the use of a sequence of load instructions and store instructions. This is illustrated in FIG. 5B. In FIG. 5B, each load instruction specifies a 64-bit value, which is then loaded into the register 402. The corresponding store instruction then saves that 64-bit value back out to memory. The set of load instructions collectively specifies the area that is to be copied. Note that in a similar manner to that of FIG. 5A, once the first value has been loaded, a cache line containing the neighbouring values becomes available so that the neighbouring values can be accessed more quickly than they would via main memory.

When executing a memory block instruction or a sequence of load instructions that collectively specify a block of memory, the inventors have realised that the loaded data will only be used once during the operation. In particular, once a value has been read to the register 402 and then written back out to memory, it is no longer needed. If each such data item were to be loaded into the level one cache, then this could lead to the eviction of every other data item in the level one cache. Since the existing data is more likely to be used again, it is worth avoiding evicting it from the cache if possible. As such, the present technique detects when a memory block instruction is being executed (e.g. by opcode comparison) so that the mode control circuitry 204 changes the operating mode of the cache control circuitry 202 to the non-allocation mode. Such a detection may be performed by the decoding circuitry 106 itself, which, in some examples, is configured to send a signal indicating that a memory block instruction is being executed to the mode control circuitry 204.

Alternatively or in addition, the sequence of load instructions may be detected by detection circuitry 116 coupled to the decoding circuitry 106. In some examples, the detection circuitry 116 is configured to track recently decoded instructions. If a sequence of load instructions that collectively specify the block of memory is detected, then a signal is sent to the mode control circuitry 204 to change the operating mode of the cache control circuitry 202 to the non-allocation mode. In particular, the detection circuitry 116 tracks the memory addresses specified by each load instruction in the sequence. If the memory addresses are at regular intervals, and the interval is equal to the amount of data loaded in a single load operation, then the sequence is collectively specifying a block of memory. For example, if a single load operation loads 32 bits of data, and each memory address in the sequence is 32 bits apart, then the detection circuitry detects the sequence of load operations as collectively specifying a block of memory. The end of the sequence is detected by a load instruction indicating a memory address that does not have the same interval as the load instructions in the sequence or by an instruction that is not a load instruction. When the end of the sequence is detected, a further signal is sent to the mode control circuitry 204 to change the operating mode back to the allocation mode. In some embodiments the detection is performed based on a series of load instructions (that collectively specify a block of memory) interspersed with other instructions that operate on the data loaded from memory. In these situations, the end of the sequence can be detected by a load instruction indicating a memory address that does not have the same interval as the load instructions in the sequence or by an instruction other than the interspersing instructions being encountered.

In other examples, the detection is based on the program code itself. A flag indicating the sequence of load instructions can be inserted by, for example, a program compiler. A compiler can determine the presence of such a memory block instruction either by analysis of the program (as a whole) or even by the use of a memory copy command that might be provided by a high level programming language. The detection circuitry 116 can detect the flag, and hence detect the sequence of load instructions, causing a signal to be sent to the mode control circuitry 204 to change the operating mode of the cache control circuitry 202 to the non-allocation mode. A further flag indicating the end of the sequence is inserted to cause the mode control circuitry 204 to change the operating mode back to the allocation mode.

Figure 6:
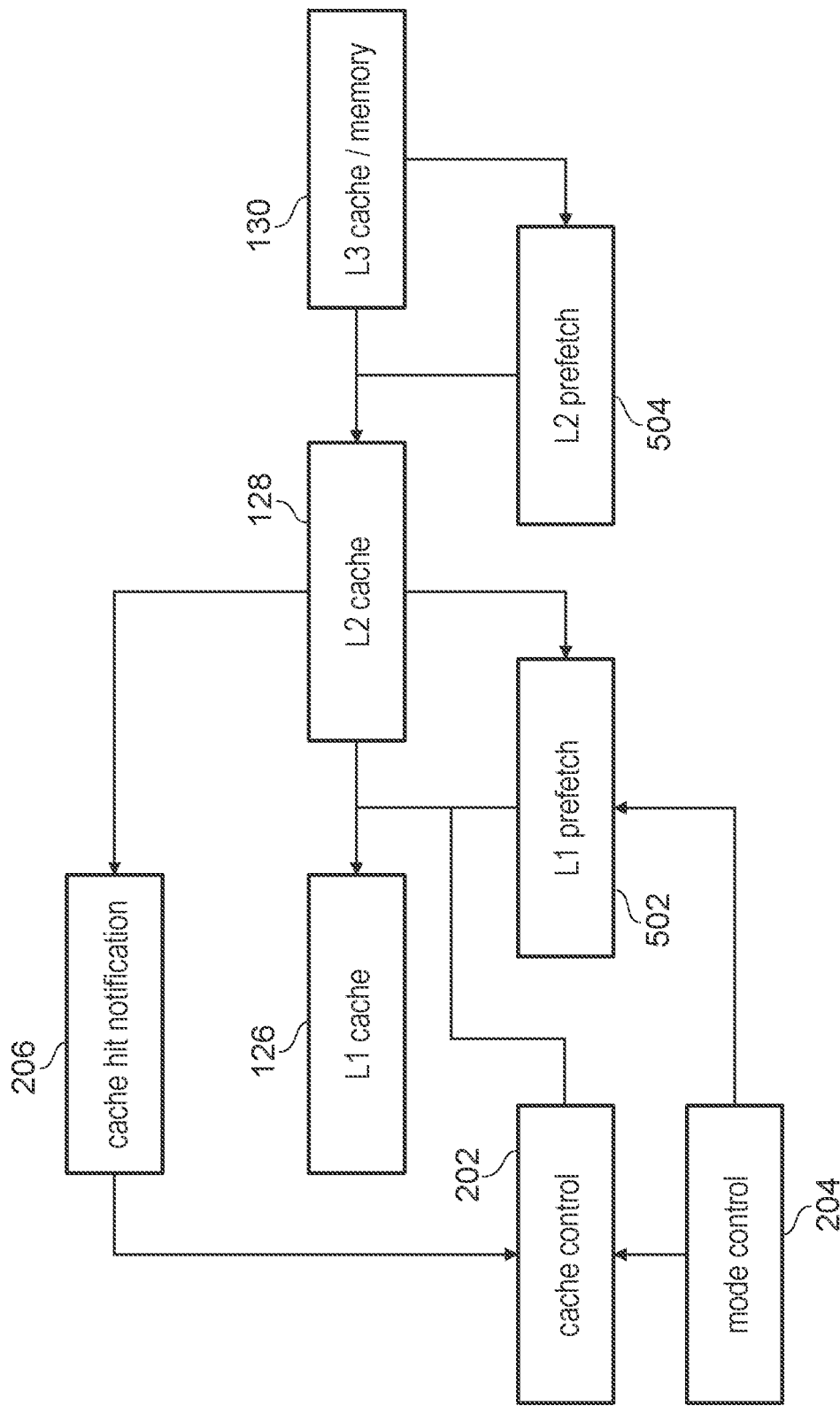
FIG. 6 illustrates prefetching circuitry.

FIG. 6 illustrates an example in which the apparatus comprises L1 prefetching circuitry 502 and L2 prefetching circuitry 504. The L1 prefetching circuitry 502 and L2 prefetching circuitry 504 are configured to predict a future load operation before it is explicitly received, and hence predict a future data item before it is explicitly required. The prediction may be determined based on a previous history of memory addresses specified in load operations. When that future load operation is performed, the required data will be quickly available in one of the caches 126, 128, improving performance.

The L2 prefetching circuitry 504 is configured to use the prediction to prefetch data from lower levels of the memory hierarchy (e.g. an L3 cache or memory 130). The prefetched data is then stored to the L2 cache 128. The L1 prefetching circuitry 502 is similarly configured, and prefetches the data from the L2 cache 128 and stores it in the L1 cache 124.

As described above, when in the non-allocation mode, the allocation of data to the L1 cache 126 is suppressed. The same advantages can be achieved by disabling the L1 prefetching circuitry 502. As shown in FIG. 6, the L1 prefetching circuitry is responsive to the mode control circuitry 204, and is disabled when the mode control circuitry 204 switches to the non-allocation mode. By avoiding prefetched data from being stored to the L1 cache 126, it is possible to avoid unnecessary evictions of potentially valuable data from the L1 cache 126. Furthermore, any energy that would normally be consumed by the L1 prefetching circuitry 502 can be saved.

By contrast, data in the L2 cache 128 is typically of lesser importance. Therefore, the benefits of prefetching data to the L2 cache 128 by the L2 prefetching circuitry 504 may outweigh the benefits of retaining the data in the L2 cache 128. To this end, the L2 prefetching circuitry 504 is configured to operate in both the allocation mode, and the non-allocation mode.

It is necessary to know when to delete data in the line fill buffer 132 to prevent it from getting full. In the allocation mode the line fill buffer deletes the cache line after the cache line has been moved to the L1 cache 126. That is to say that the cache line is moved from the line fill buffer to the storage portion 125 of the L1 cache 126.

Figure 7:
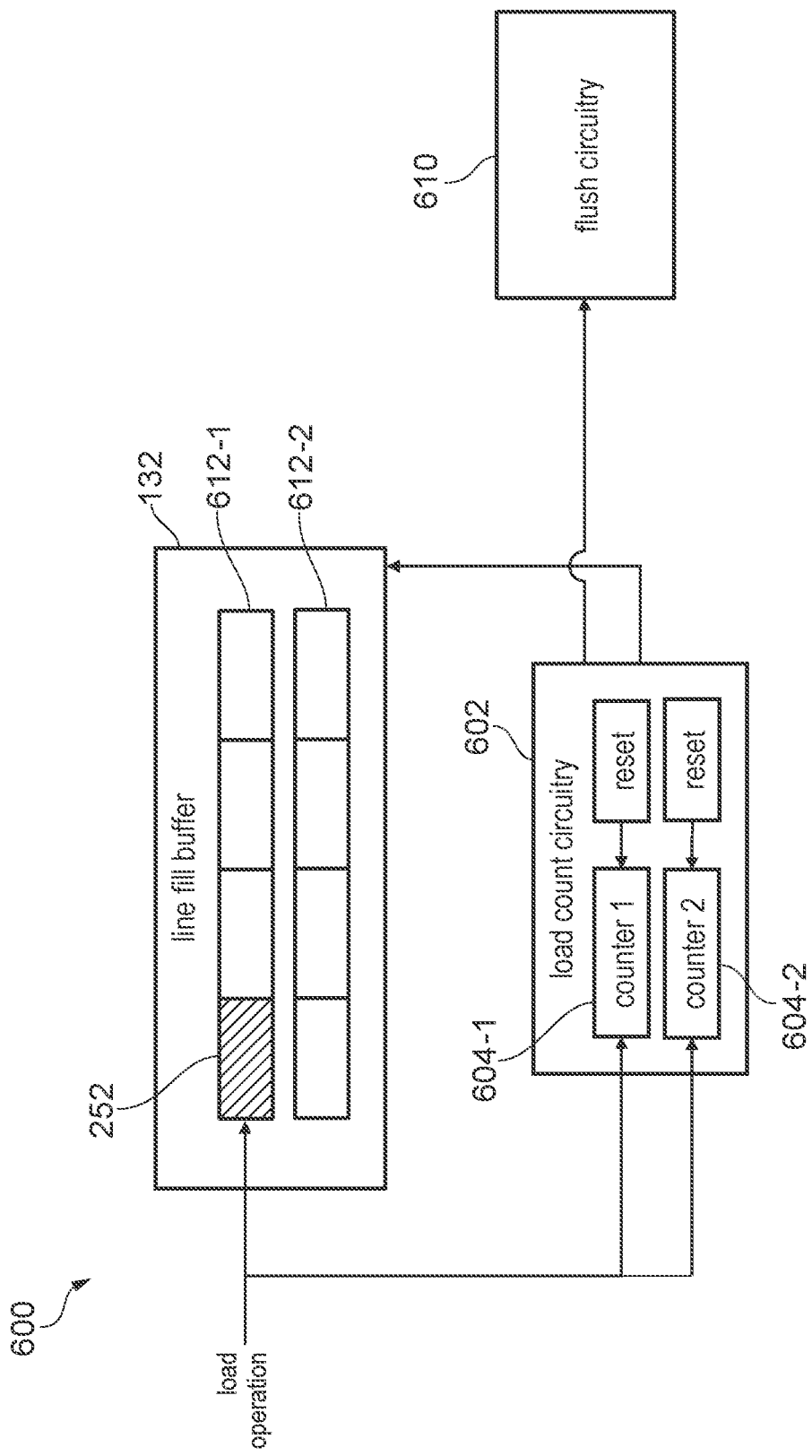
FIG. 7 illustrates an apparatus for controlling data in a line fill buffer.

FIG. 7 illustrates the line fill buffer 132 containing a plurality of cache lines 612-1, 612-2. Cache line 612-1 includes a given data item 252 and three further data items 614, each of 64 bits. In this example, each cache line contains 32 bytes of data.

Load count circuitry 602 is provided to count the number of load requests that have specified each cache line in the line fill buffer 132. The load count circuitry 602 comprises a set of counters 604-1, 604-2, each corresponding to one of the cache lines of the line fill buffer 132. The initial value of each counter is set when a cache line is loaded into the line fill buffer 132 and is set to the number of data items in the cache line that are to be accessed. This can be inferred from the memory block instruction itself, which specifies the amount of copying to be performed. In the case of a sequence of load instructions that emulate a memory block instruction, this could be achieved by a 'lookahead' of the instruction stream. The load count circuitry 602 detects the incoming load operation performed in the line fill buffer 132 (i.e. such as in FIG. 2B). When a load operation is detected, the counter 604-1 corresponding to the cache line 612-1 that is being accessed is decremented. When the value in the counter 604-1 is equal to 0, it is determined that every data item in the cache line 612-1 has been read, and the cache line 612-1 can be deleted from the line fill buffer 132. The load count circuitry 602 outputs a signal to the line fill buffer 134 to delete the cache line 612-1.

It will be appreciated that an incrementing counter could also be used by additionally storing the number of items in the cache line that are to be accessed.

An additional or alternative approach could be to use a time-to-live (TTL) for each cache line in the line fill buffer. After a specified period of time (measured by a clock, or a number of operations, or a number of operations of a specific type), the cache line in the line fill buffer is automatically invalidated.

In some examples, a memory block instruction is preceded by a branch instruction. Instructions after the branch instruction can be executed, even if a determination of whether the branch is taken or not has not yet been made. The instructions after the branch instruction are executed based on a prediction of which branch will be taken. This type of instruction execution is known as speculative execution. A memory block instruction may be executed speculatively, but in the event of a misprediction, the speculative memory block instruction is flushed during the loading of a cache line by flush circuitry 610. In such examples, the load operations would not be performed, and the load count circuitry 602 would not count the required number of load operations for the line fill buffer 132 to delete the cache line. To prevent the cache line from staying in the line fill buffer 132, the load count circuitry 602 determines that the number of load operations is less than the number of data items in the cache line (e.g. because the counter is not yet zero), and then signals the flush circuitry 610 to prevent flushing of the respective load operations. This allows the load operations to be performed, and then the load count circuitry 602 can cause the cache line to be deleted from the line fill buffer 132 as described above. Once the data items have been loaded, they may be immediately flushed instead of being stored, for example, into registers 112.

Figure 8:
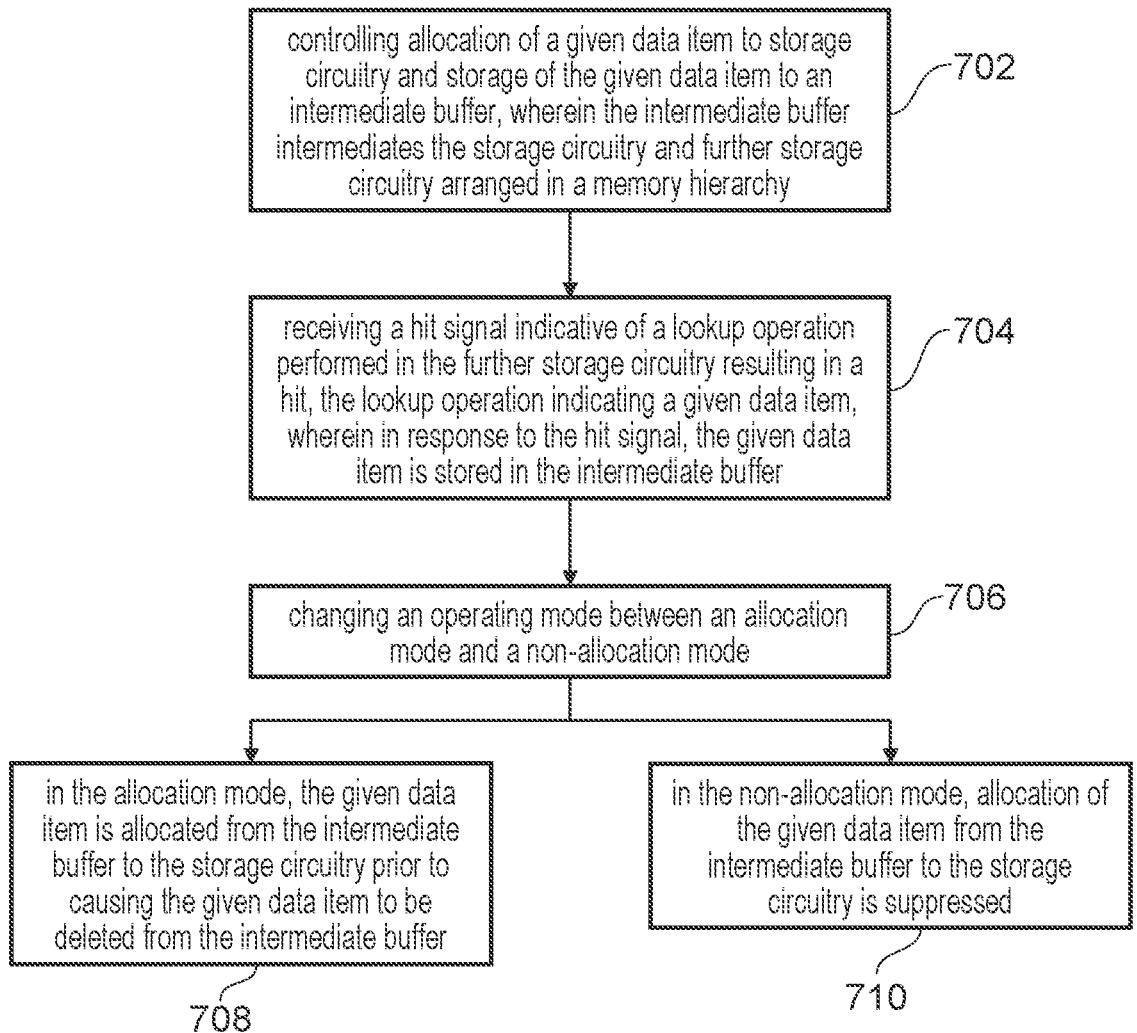
FIG. 8 illustrates a method according to one aspect of the present techniques.

FIG. 8 illustrates a method according to an aspect of the present techniques. At step 702, the allocation of data items to storage circuitry and storage of the data item to an intermediate buffer is controlled, wherein the intermediate buffer intermediates the storage circuitry and further storage circuitry arranged in a memory hierarchy. At step 704, a hit signal indicative of a lookup operation performed in the further storage circuitry resulting in a hit is received, the lookup operation indicating a given data item, wherein in response to the hit signal, the given data item is caused to be stored in the intermediate buffer. At step 706, an operating mode between an allocation mode and a non-allocation mode is changed. At step 708, in the allocation mode, the given data item is caused to be allocated from the intermediate buffer to the storage circuitry prior to causing the given data item to be deleted from the intermediate buffer. At step 710, in the non-allocation mode, allocation of the given data item from the intermediate buffer to the storage circuitry is suppressed.

In such examples as above, the capability of switching between the allocation mode and the non-allocation mode allows for more efficient use of the data pathways between storage circuitries in scenarios where caching data is less necessary. Therefore, the available bandwidth between the caches is increased, and the incurred energy use of storing and evicting data from storage circuitry is reduced, thus improving performance of a data processing system incorporating the present apparatus.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus comprising:
control circuitry configured to control allocation of a given data item to storage circuitry and storage of the given data item to an intermediate buffer, wherein the intermediate buffer intermediates the storage circuitry and further storage circuitry arranged in a memory hierarchy;
hit notification circuitry configured to receive a hit signal indicative of a lookup operation performed in the further storage circuitry resulting in a hit, the lookup operation indicating the given data item, wherein in response to the hit signal, the hit notification circuitry is configured to cause the control circuitry to store the given data item in the intermediate buffer; and
mode control circuitry configured to change an operating mode of the control circuitry between an allocation mode and a non-allocation mode, wherein
in the allocation mode, the control circuitry is configured to cause the allocation of the given data item from the intermediate buffer to the storage circuitry prior to causing the given data item to be deleted from the intermediate buffer; and
in the non-allocation mode, the control circuitry is configured to suppress the allocation of the given data item from the intermediate buffer to the storage circuitry.

(2) The apparatus of clause 1, wherein:
the mode control circuitry is configured to change the operating mode of the control circuitry to the non-allocation mode in response to a memory block instruction, wherein the memory block instruction specifies a block of memory.

(3) The apparatus of clause 2, wherein:
the mode control circuitry is configured to change the operating mode of the control circuitry to the allocation mode in response to completion of the memory block instruction.

(4) The apparatus of any preceding clause, comprising:
detection circuitry configured to detect a sequence of load instructions, wherein the load instructions collectively specify a block of memory, wherein
in response to detecting the sequence of load instructions, the detection circuitry is configured to cause the mode control circuitry to change the operating mode of the control circuitry to the non-allocation mode.

(5) The apparatus of any preceding clause, comprising:
load circuitry configured to perform a load operation indicating the given data item, wherein
in the non-allocation mode, the mode control circuitry is configured to cause the load circuitry to perform the load operation in the intermediate buffer.

(6) The apparatus of any preceding clause, wherein:
the intermediate buffer comprises a line fill buffer; and
a cache comprises the storage circuitry and the intermediate buffer.

(7) The apparatus of clause 6, wherein:
the line fill buffer is configured to store a cache line comprising a plurality of data items, the plurality of data items including the given data item and at least one further data item;
load count circuitry configured to count a number of load operations indicating at least one of the plurality of data items; and
in response to the number of load operations being equal to a number of data items in the plurality of data items, the load count circuitry causes the line fill buffer to delete the cache line.

(8) The apparatus of clause 7, wherein:
the load count circuitry comprises a counter configured to increment or decrement in response to a load operation being performed, wherein the load operation indicates at least one of the plurality of data items; and the counter is configured to reset in response to the line fill buffer deleting the cache line.

(9) The apparatus of any one of clauses 7-8, comprising:
flush circuitry configured to trigger a flush, wherein
if the number of load operations is less than the number of data items in the plurality of data items, the flush circuitry is configured to suppress flushing the load operations indicating one of the plurality of data items until the line fill buffer deletes the cache line.

(10) The apparatus of any preceding clause, wherein:
a cache comprises the storage circuitry and a further cache comprises the further storage circuitry; and
the cache and the further cache are subject to an exclusive cache policy.

(11) The apparatus of any preceding clause, comprising:
first prefetching circuitry configured to prefetch a future data item based on a predicted load operation and to store the future data item in the storage circuitry; and
the mode control circuitry is configured to control the first prefetching circuitry based on the operating mode of the control circuitry, wherein
in the allocation mode, the mode control circuitry is configured to enable the first prefetching circuitry; and
in the non-allocation mode, the mode control circuitry is configured to disable the first prefetching circuitry.

(12) The apparatus of clause 11, comprising:
second prefetching circuitry configured to prefetch the future data item based on the predicted load request and to store the future data item in the further storage circuitry;
the first prefetching circuitry is configured to prefetch the future data item from the further storage circuitry, after the future data item has been stored in the further storage circuitry by the second prefetching circuitry, wherein
the mode control circuitry is configured to enable the second prefetching circuitry in the non-allocation mode.

(13) A method comprising:
controlling allocation of a given data item to storage circuitry and storage of the data item to an intermediate buffer, wherein the intermediate buffer intermediates the storage circuitry and further storage circuitry arranged in a memory hierarchy;
receiving a hit signal indicative of a lookup operation performed in the further storage circuitry resulting in a hit, the lookup operation indicating the given data item, wherein in response to the hit signal, the given data item is stored in the intermediate buffer; and
changing an operating mode between an allocation mode and a non-allocation mode, wherein
in the allocation mode, the allocation of the given data item from the intermediate buffer to the storage circuitry occurs prior to causing the given data item to be deleted from the intermediate buffer; and
in the non-allocation mode, the allocation of the given data item from the intermediate buffer to the storage circuitry is suppressed.

(14) A non-transitory computer-readable medium to store computer-readable code for fabrication of an apparatus comprising:
control circuitry configured to control allocation of a given data item to storage circuitry and storage of the given data item to an intermediate buffer, wherein the intermediate buffer intermediates the storage circuitry and further storage circuitry arranged in a memory hierarchy;
hit notification circuitry configured to receive a hit signal indicative of a lookup operation performed in the further storage circuitry resulting in a hit, the lookup operation indicating the given data item, wherein in response to the hit signal, the hit notification circuitry is configured to cause the control circuitry to store the given data item in the intermediate buffer; and
mode control circuitry configured to change an operating mode of the control circuitry between an allocation mode and a non-allocation mode, wherein
in the allocation mode, the control circuitry is configured to cause the allocation of the given data item from the intermediate buffer to the storage circuitry prior to causing the given data item to be deleted from the intermediate buffer; and
in the non-allocation mode, the control circuitry is configured to suppress the allocation of the given data item from the intermediate buffer to the storage circuitry.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
control circuitry configured to control allocation of a given data item to storage circuitry and storage of the given data item to an intermediate buffer, wherein the intermediate buffer intermediates the storage circuitry and further storage circuitry arranged in a memory hierarchy;
hit notification circuitry configured to receive a hit signal indicative of a lookup operation performed in the further storage circuitry resulting in a hit, the lookup operation indicating the given data item, wherein in response to the hit signal, the hit notification circuitry is configured to cause the control circuitry to store the given data item in the intermediate buffer; and mode control circuitry configured to change an operating mode of the control circuitry between an allocation mode and a non-allocation mode, wherein in the allocation mode, the control circuitry is configured to cause the allocation of the given data item from the intermediate buffer to the storage circuitry prior to causing the given data item to be deleted from the intermediate buffer;

in the non-allocation mode, the control circuitry is configured to suppress the allocation of the given data item from the intermediate buffer to the storage circuitry; wherein the intermediate buffer comprises a line fill buffer;

a cache comprises the storage circuitry and the intermediate buffer;

the line fill buffer is configured to store a cache line comprising a plurality of data items, the plurality of data items including the given data item and at least one further data item;

the apparatus comprises load count circuitry configured to count a number of load operations indicating at least one of the plurality of data items; and in response to the number of load operations being equal to a number of data items in the plurality of data items, the load count circuitry is configured to cause the line fill buffer to delete the cache line.

2. The apparatus of claim 1, wherein:

the mode control circuitry is configured to change the operating mode of the control circuitry to the non-allocation mode in response to a memory block instruction, wherein the memory block instruction specifies a block of memory.

3. The apparatus of claim 2, wherein:

the mode control circuitry is configured to change the operating mode of the control circuitry to the allocation mode in response to completion of the memory block instruction.

4. The apparatus of claim 1, comprising:

detection circuitry configured to detect a sequence of load instructions, wherein the load instructions collectively specify a block of memory, wherein in response to detecting the sequence of load instructions, the detection circuitry is configured to cause the mode control circuitry to change the operating mode of the control circuitry to the non-allocation mode.

5. The apparatus of claim 1, comprising:

load circuitry configured to perform a load operation indicating the given data item, wherein in the non-allocation mode, the mode control circuitry is configured to cause the load circuitry to perform the load operation in the intermediate buffer.

6. The apparatus of claim 1, wherein:

the load count circuitry comprises a counter configured to increment or decrement in response to a load operation being performed, wherein the load operation indicates at least one of the plurality of data items; and the counter is configured to reset in response to the line fill buffer deleting the cache line.

7. The apparatus of claim 1, comprising:

flush circuitry configured to trigger a flush, wherein if the number of load operations is less than the number of data items in the plurality of data items, the flush circuitry is configured to suppress flushing the load operations indicating one of the plurality of data items until the line fill buffer deletes the cache line.

8. The apparatus of claim 1, wherein:

a cache comprises the storage circuitry and a further cache comprises the further storage circuitry; and the cache and the further cache are subject to an exclusive cache policy.

9. An apparatus comprising:

control circuitry configured to control allocation of a given data item to storage circuitry and storage of the given data item to an intermediate buffer, wherein the intermediate buffer intermediates the storage circuitry and further storage circuitry arranged in a memory hierarchy;

hit notification circuitry configured to receive a hit signal indicative of a lookup operation performed in the further storage circuitry resulting in a hit, the lookup operation indicating the given data item, wherein in response to the hit signal, the hit notification circuitry is configured to cause the control circuitry to store the given data item in the intermediate buffer; and mode control circuitry configured to change an operating mode of the control circuitry between an allocation mode and a non-allocation mode, wherein in the allocation mode, the control circuitry is configured to cause the allocation of the given data item from the intermediate buffer to the storage circuitry prior to causing the given data item to be deleted from the intermediate buffer;

in the non-allocation mode, the control circuitry is configured to suppress the allocation of the given data item from the intermediate buffer to the storage circuitry, the apparatus further comprising:

first prefetching circuitry configured to prefetch a future data item based on a predicted load operation and to store the future data item in the storage circuitry; and the mode control circuitry is configured to control the first prefetching circuitry based on the operating mode of the control circuitry, wherein in the allocation mode, the mode control circuitry is configured to enable the first prefetching circuitry; and in the non-allocation mode, the mode control circuitry is configured to disable the first prefetching circuitry.

10. The apparatus of claim 9, comprising:

second prefetching circuitry configured to prefetch the future data item based on the predicted load request and to store the future data item in the further storage circuitry;

the first prefetching circuitry is configured to prefetch the future data item from the further storage circuitry, after the future data item has been stored in the further storage circuitry by the second prefetching circuitry, wherein the mode control circuitry is configured to enable the second prefetching circuitry in the non-allocation mode.

11. A method comprising:

controlling allocation of a given data item to storage circuitry and storage of the data item to an intermediate buffer, wherein the intermediate buffer intermediates the storage circuitry and further storage circuitry arranged in a memory hierarchy;

receiving a hit signal indicative of a lookup operation performed in the further storage circuitry resulting in a hit, the lookup operation indicating the given data item, wherein in response to the hit signal, the given data item is stored in the intermediate buffer; and changing an operating mode between an allocation mode and a non-allocation mode, wherein in the allocation mode, the allocation of the given data item from the intermediate buffer to the storage circuitry occurs prior to causing the given data item to be deleted from the intermediate buffer;

in the non-allocation mode, the allocation of the given data item from the intermediate buffer to the storage circuitry is suppressed;

storing a cache line comprising a plurality of data items including the given data item and at least one further data item;

counting a number of load operations indicating at least one of the plurality of data items;

in response to the number of load operations being equal to a number of data items in the plurality of data items, deleting the cache line.

12. A non-transitory computer-readable medium to store computer-readable code for fabrication of an apparatus comprising:

control circuitry configured to control allocation of a given data item to storage circuitry and storage of the given data item to an intermediate buffer, wherein the intermediate buffer intermediates the storage circuitry and further storage circuitry arranged in a memory hierarchy;

hit notification circuitry configured to receive a hit signal indicative of a lookup operation performed in the further storage circuitry resulting in a hit, the lookup operation indicating the given data item, wherein in response to the hit signal, the hit notification circuitry is configured to cause the control circuitry to store the given data item in the intermediate buffer; and mode control circuitry configured to change an operating mode of the control circuitry between an allocation mode and a non-allocation mode, wherein in the allocation mode, the control circuitry is configured to cause the allocation of the given data item from the intermediate buffer to the storage circuitry prior to causing the given data item to be deleted from the intermediate buffer;

in the non-allocation mode, the control circuitry is configured to suppress the allocation of the given data item from the intermediate buffer to the storage circuitry;

the intermediate buffer comprises a line fill buffer;

a cache comprises the storage circuitry and the intermediate buffer;

the line fill buffer is configured to store a cache line comprising a plurality of data items; the plurality of data items including the given data item and at least one further data item;

the apparatus comprises load count circuitry configured to count a number of load operations indicating at least one of the plurality of data items; and in response to the number of load operations being equal to a number of data items in the plurality of data items, the load count circuitry causes the line fill buffer to delete the cache line.

* * * * *